United States Patent
Hunter

(10) Patent No.: US 6,422,580 B1
(45) Date of Patent: Jul. 23, 2002

(54) SHOPPING CART ANTI-TIP BRACKET

(76) Inventor: Wendell Hunter, 140 Encinitas Blvd., #318, Encinitas, CA (US) 92024

( * ) Notice: Subject to any disclaimer, the term of this patent is extended or adjusted under 35 U.S.C. 154(b) by 0 days.

(21) Appl. No.: 09/619,681

(22) Filed: Jul. 19, 2000

(51) Int. Cl.[7] ............................................. B62D 39/00
(52) U.S. Cl. .................................................. 280/33.992
(58) Field of Search ..................... 280/33.992, 33.991, 280/293, 643, 33.994; 16/18 CG

(56) References Cited

U.S. PATENT DOCUMENTS

| | | | | |
|---|---|---|---|---|
| 3,048,420 A | * | 8/1962 | Umanoff | 280/33.992 |
| 3,051,936 A | * | 8/1962 | Finger et al. | 280/33.992 |
| 3,691,590 A | * | 8/1962 | Drabert | 280/16 |
| 4,610,454 A | * | 9/1986 | Gill | 280/163 |
| 4,861,110 A | | 8/1989 | Rumpke | |
| 5,090,724 A | * | 2/1992 | Fiore | 280/643 |
| 5,306,028 A | | 4/1994 | Pike et al. | |
| 5,630,600 A | * | 5/1997 | Pasillas | 280/33.994 |
| 5,971,512 A | * | 10/1999 | Swan | 312/281 |

* cited by examiner

*Primary Examiner*—Brian L. Johnson
*Assistant Examiner*—Gerald Klebe
(74) *Attorney, Agent, or Firm*—Donn K. Harms

(57) ABSTRACT

An anti-tipping device for a shopping cart having a pair of non-pivotal wheels and a pair of pivotal wheels. The anti-tipping device comprises a pair of concave downward extending anti-tipping members clamped to the outer surface of the lower frame adjacent to the pivotal wheels. The lower end of the anti-tipping members extend close to but not touching the cart support surface. When the cart is tipped sideways at least one of the anti-tipping members contacts the cart support surface preventing any further tipping of the cart.

6 Claims, 1 Drawing Sheet

SHOPPING CART ANTI-TIP BRACKET

BACKGROUND OF THE INVENTION

The present invention is directed to shopping carts and particularly to the prevention of four wheeled shopping carts having two fixed direction wheels and two swivel wheels from tipping over forward or sideways when the swivel wheels are swivelled toward each other.

In most retail stores, such as super markets or the like, shopping carts are provided for use so that customers can conveniently transport their selected merchandise through the store, past the checkout stand and eventually to the customer's auto or other transportation means.

In the event that the cart is loaded and the greater mass of the merchandise is positioned in the front of the cart or children are allowed to ride in the cart while shopping or transporting the merchandise and they move around within the cart to a position that renders the cart front end or side heavy the cart could tip dumping the merchandise or a child in the cart to the ground or cart support surface.

Obviously if this were to occur the merchandise would be damaged and even more seriously a child could be severely injured.

U.S. Pat. No. 3,051,936 issued to A. E. Finger et Al teaches principally an alarm system to detect merchandise positioned on a bottom shelf of a four wheel shopping cart. The patent does utilize a pair of legs on the back sides of the cart that could prevent the cart from tipping sideways but would not prevent the cart from tipping forward.

U.S. Pat. No. 5,090,724 to inventor Deborah A. Flore teaches a pair of anti-tip legs, one in the front of the stroller and one in the back of the stroller. The legs can be deployed manually to prevent the stroller from tipping either backwards or forward but not sideways. Unlike the present invention the anti-tipping feature of this invention does not teach sideways tipping and is not always in place to prevent front tipping while the cart is moveable and must be manually deployed if the cart is to be unattended and stowed in a non-deployed position to again move the stroller.

U.S. Pat. Nos. 4,610,454 and 5,630,600 respectively to William H. Gill and Norbert Q. Pasillas both teach stops that must be manually deployed for use as brakes that would could possibly prevent backward and forward tipping respectively when deployed for rendering the cart stationery but would not prevent sideways tipping even when deployed.

As such, it is very advantages to provide both an anti-sideways tipping structure for a shopping cart as described that is always fixed is a deployed position to prevent tipping either forward or sideways and yet allows the shopping cart to function as intended at all times.

SUMMARY OF THE INVENTION

The invention is directed to preventing the forward end sideway tipping of shopping carts to prevent injury to a child riding in the cart or the damage to merchandise in the cart. A typical shopping cart on which the anti-tipping device is intended can be found, by way of example, in U.S. Pat. No. 3,051,936 which teaches a shopping cart in with the two front support wheels pivot relative to the rear to the non-pivotal rear wheels. It should be understood that this invention works equally as well when applied to carts with pivotal rear wheels and non-pivotal front wheels.

One anti-tipping member is attached to the frame adjacent to and on the outside of each of the pivotal wheels. The anti-tipping member is formed with a concave side adjacent to the wheel so that the wheels can pivot relative thereto in a normal manner. The anti-tipping members are clamped to the bottom support frame of the cart and can be added to existing carts as well as new carts.

The manufacturing of the carts does not have to be changed to utilize the anti-tipping members of this invention.

The clamping of the anti-tipping members can be with clamps formed on anti-tipping member on the cart frame attachment end or can be clamped to the cart frame by any manner suitable for the purpose intended. The anti-tipping members can be constructed of plastic, fibreglass, metal or any other material suitable for the purpose intended.

The principal object of this invention is to provide a fail safe means for preventing shopping carts from tipping forward or sideways normal use.

Another object of this invention is to prevent shopping carts from front end and sideways tipping when the pivotal wheels become directed toward each other.

Still another object of the invention is to add anti-tipping members that do not interfere with normal wheel pivoting.

Yet another object of this invention is to provide an inexpensive means for preventing the forward and sideways tipping of shopping carts that is easily attachable to existing or newly manufactured shopping carts of the type defined herein.

Other objects and advantages of the invention will be apparent during the reading of the following description along with the accompanying drawing Figures in which like numerals are used to designate like parts or elements.

IN THE DRAWING FIGURES

DETAILED DESCRIPTION OF THE PREFERRED EMBODIMENT OF THE INVENTION

Figure 1:
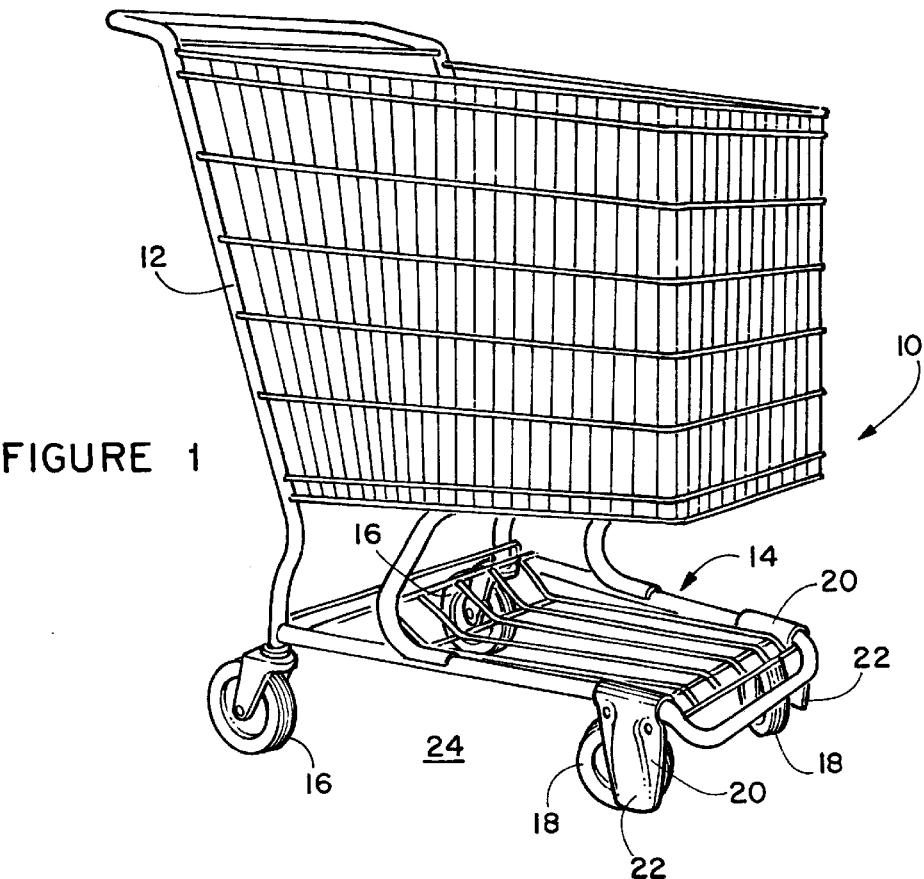
FIG. 1 is a perspective showing of a shopping cart with the anti-tipping members of the invention installed on the front outside of the cart lower frame.

Referring now to the various drawing Figures, drawing FIG. 1 depicts a shopping cart 10 having a basket 12 for containing selected items, a lower support rack 14 for heavy items, a pair of non-pivotal wheels 16 in the back off the cart, a pair of pivotal wheels 18 on the front of the cart and a pair of anti-tipping members 20 clamped to the frame around the lower rack support adjacent to the pivotal front wheels. The bottom surface 22 of the anti-tipping members is slightly elevated from the wheel support surface 24 to allow for normal mobility of the cart 10. There has to be a slight tipping of the cart for the bottom surface of the anti-tipping members 20 to contact the support surface and thereby terminate any further tipping of the cart.

Figures 2, 3, 4:
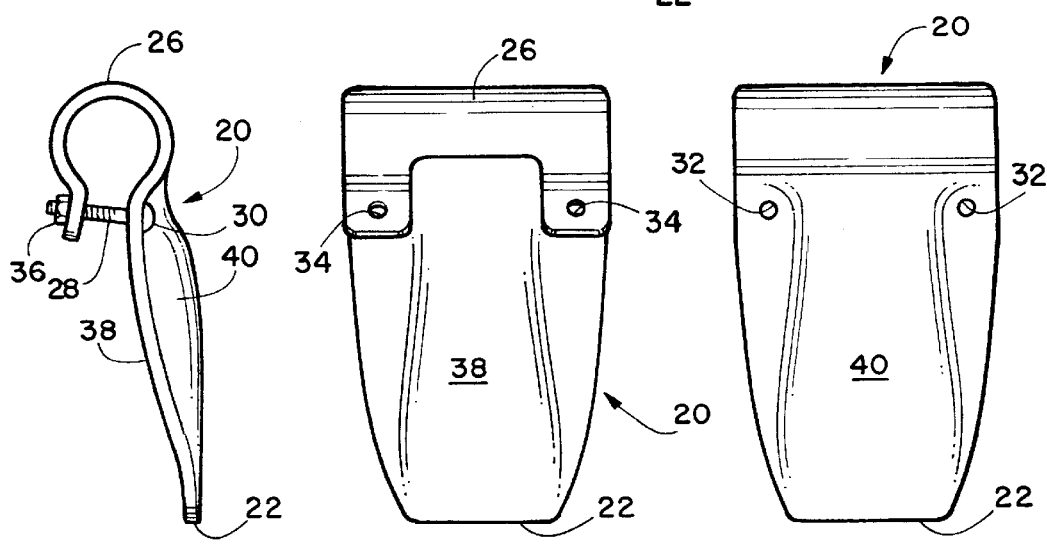
FIG. 2 is a side view showing of the anti-tipping member of the invention.
FIG. 3 is a back view of the anti-tipping member of the invention.
FIG. 4 is a front view of the anti-tipping member of the invention.

Drawing FIG. 2 depicts a side view of an anti-tipping member 20. A clamp 26 for clamping to the frame of the shopping cart is formed at the top of the anti-tipping member. A threaded bolt 28 having a head 30 at one end passes through apertures 32 and 34 (see drawing FIGS. 3 and 4) and a nut 36 is threaded on the bolt and tightened to clamp the anti-tipping member 20 to the cart lower support rack frame 14 as depicted in drawing FIG. 1.

Drawing FIG. 3 is a rear view of the anti-tipping member showing the concave inner surface 38 of anti-tipping member. The concave inner surface allows the wheel 18 to pivot about the anti-tipping member without contact therewith.

Drawing FIG. 4 is a front view showing of the anti-tipping member 20. The apertures 32 are counter sunk to receive the head of the bolt so as to provide a smooth outer surface with the bolt installed. The nut is generally located on the inner surface 38 of the anti-tipping member to prevent injury to any one in contact with the front surface 40 as the rear surface is not normally accessible to cause injury from the exposed bolt end.

Figure 5:
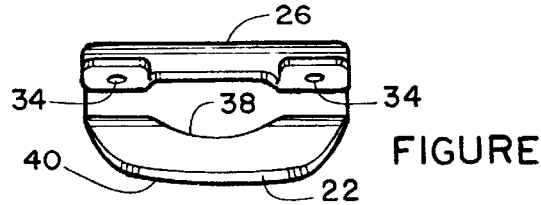
FIG. 5 is a bottom view of the anti-tipping member of the invention.

Drawing FIG. 5 is a top showing of the anti-tipping member.

The anti-tipping members can be constructed of any material suitable for the purpose intended. The material must be suitably resilient or formable to allow for movement of the top clamp portion of the anti-tipping member when this portion is slightly deformed for clamping to the cart frame.

It should be understood by those skilled in the art that obvious structural modifications can be made without departing from the spirit of the invention. Accordingly, reference should be made primarily to the accompanying claims, rather than the foregoing specifications, to determine the scope of the invention.

Having thus described the invention, what is claimed is:

1. A restraining device mounted to and preventing unwanted tipping of a manually propelled cart, said cart having a front and back portion with a basket mounted on a pair of pivotal wheels and a pair of non-pivotal wheels, said wheels being supported by a lower frame member, said restraining device comprising:

pair of anti-tipping members having an upper and a lower surface, said lower surface extending downward from said lower frame member with said lower surface positionable at a location substantially parallel to and slightly above a cart support surface and an intermediate body portion positioned between said lower and upper surface, one anti-tipping member positioned adjacent to each of said pivotal wheels, said anti-tipping members having a concave surface adjacent to said pivotal wheels thereby allowing said pivotal wheels to pivot, and clamping means for clamping said anti-tipping members to said lower frame member.

2. The invention as defined in claim 1 wherein said pivotal wheels are on said front portion of said cart.

3. The invention as defined in claim 1 wherein said clamping means is formed on said top surface of said anti-tipping member.

4. The invention as defined in claim 3 wherein said clamping means extends around said frame member and terminates below said lower frame member adjacent to said intermediate body portion; said top portion below said frame member and said intermediate body portion each have a pair of apertures that are in alignment and a bolt passes through said aligned apertures in said top portion and intermediate body portion for clamping said anti-tipping member to said lower frame.

5. The invention as defined in claim 1 wherein the anti-tipping member is formed of plastic.

6. The invention as defined in claim 1 wherein the anti-tipping member is formed of metal.

* * * * *